Feb. 7, 1939.     C. W. CARPENTER     2,145,847
MULTIWHEELED VEHICLE JACK AND JACK HOLDER
Filed Dec. 5, 1936     5 Sheets-Sheet 1
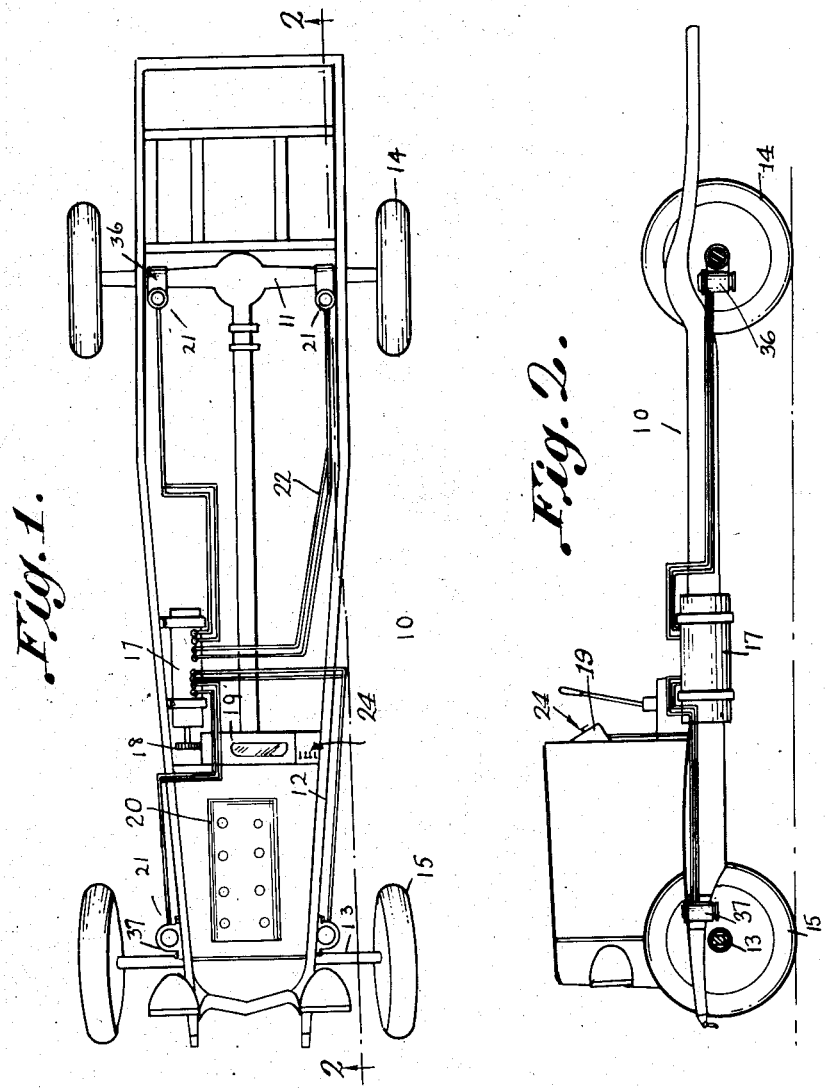
INVENTOR.
CHARLES W CARPENTER.
BY Miller & Miller
ATTORNEYS.

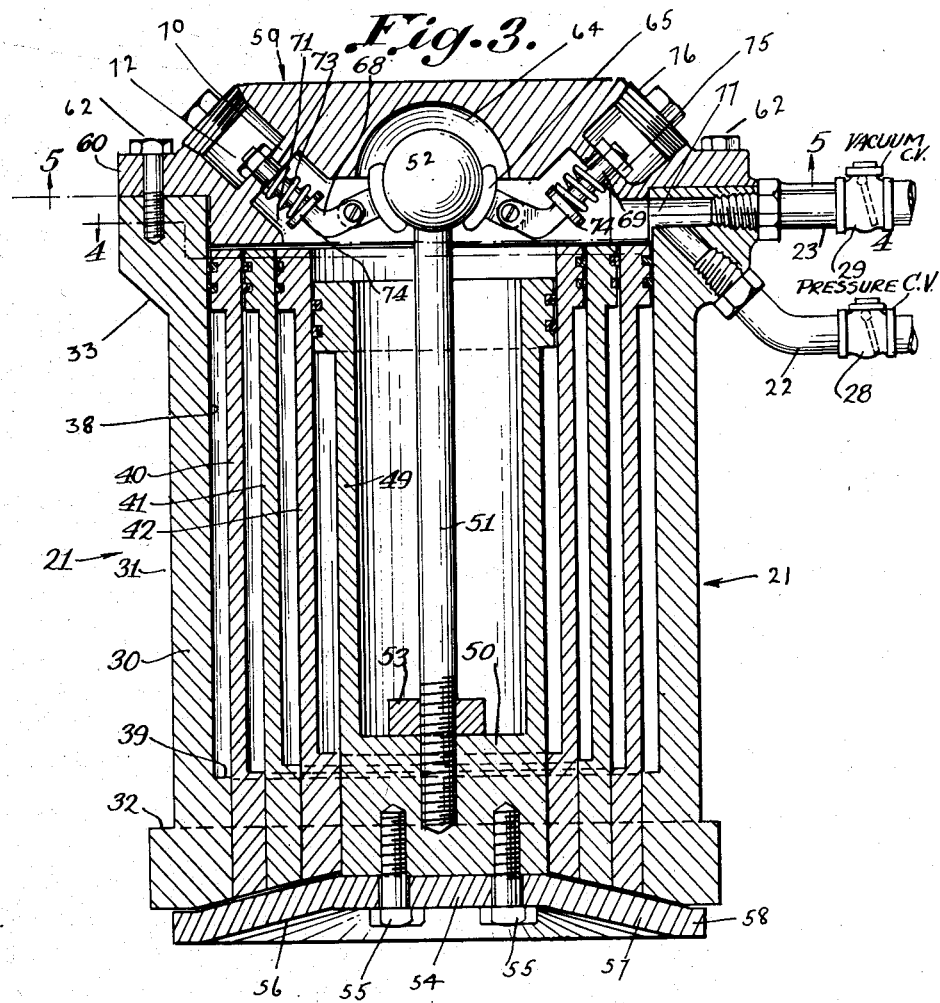

Feb. 7, 1939.   C. W. CARPENTER   2,145,847
MULTIWHEELED VEHICLE JACK AND JACK HOLDER
Filed Dec. 5, 1936   5 Sheets-Sheet 3

INVENTOR.
CHARLES W. CARPENTER
BY Miller & Miller
ATTORNEYS.

Feb. 7, 1939. C. W. CARPENTER 2,145,847
MULTIWHEELED VEHICLE JACK AND JACK HOLDER
Filed Dec. 5, 1936 5 Sheets-Sheet 5

INVENTOR.
CHARLES W CARPENTER
BY Miller & Miller
ATTORNEYS.

Patented Feb. 7, 1939

2,145,847

UNITED STATES PATENT OFFICE 2,145,847

MULTIWHEELED VEHICLE JACK AND JACK HOLDER

Charles W. Carpenter, Huntersville, N. C.

Application December 5, 1936, Serial No. 114,482

9 Claims. (Cl. 254—86)

This invention relates to a vehicle jack and jack-holder and more specifically to a jacking system which is intended to be permanently attached to the vehicle and may be controlled by a person within the vehicle to raise any one or more of the wheels simultaneously as well as for lowering the same thereafter and then positively holding or locking the jack elements of the system in non-jacking position.

Further, applicant's invention is to provide an improved jack unit which will be sturdy in construction and positive in operation, either in the jack position or in the non-jacking position.

A still further object of this invention is to provide a jacking system wherein the jack units may be attached to any convenient position on the vehicle; thus, a unit will, preferably, be placed at each end of the rear axle of the vehicle, and other units will, preferably, be placed at each side of the frame adjacent the front axle of the vehicle, particularly in the case where the front axle of the vehicle is of the flexible or articulated type and is not a one-piece axle.

The jacking units are intended to be connected by fluid pressure and vacuum lines to any suitable central pressure and vacuum producing pump, preferably by the motor of the vehicle but not necessarily so, with suitable control means connecting from the pump to the instrument board, or other suitable place easily accessible to the operator of the vehicle. Each jacking unit will necessarily be made of a suitable size, according to the position to which it is to be installed on the vehicle, the jacking unit mounted on the frame on the front of the vehicle being larger or longer than that mounted on the axles at the rear of the vehicle, so as to provide the necessary additional clearance due to the different mounting.

The jacking system of this invention is not restricted to a self-powered vehicle, but may likewise be utilized on trailers, either the freight carrying type such as truck trailers or the passenger carrying type, such as camping trailers or so-called land yachts. It is especially useful on such trailers for holding them firmly in position, both for the purpose of facilitating their attachment to and detachment from the tractor or power vehicle, as well as for holding them stationary when used in detached position; thus, when a land yacht is parked the jack may be used to steady the yacht for camping purposes. Of course, if the vehicle or land yacht is to be held jacked up for an indefinite period of time, supporting horses or other suitable means may be used to supplement the jacks to avoid keeping the pressure in the jacks for an indefinite period, thus avoiding the possibility of leakage.

On a non-powered vehicle, the jacking system may include any suitable type of hand or foot operating pump.

With the foregoing and other objects in view, as will hereinafter become apparent, this invention comprises the constructions, combinations and arrangements of parts hereinafter set forth, disclosed and shown on the accompanying drawings. In these drawings:

Fig. 1 is a top plan skeleton view of a chassis of a vehicle to which this jack has been applied.

Fig. 2 is a sectional view on line 2—2 of Fig. 1.

Fig. 3 is a vertical sectional view through the jack in collapsible position.

Figure 4:
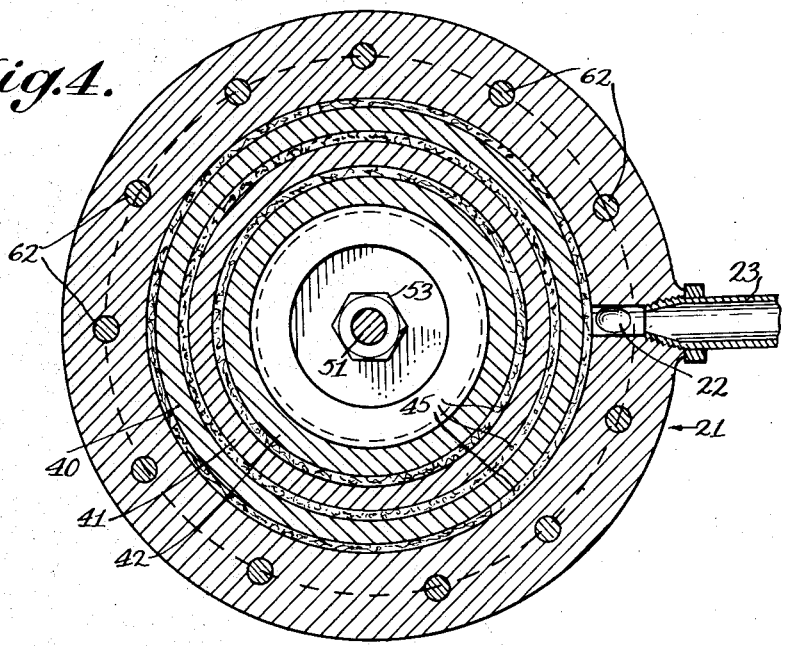
Figure 5:
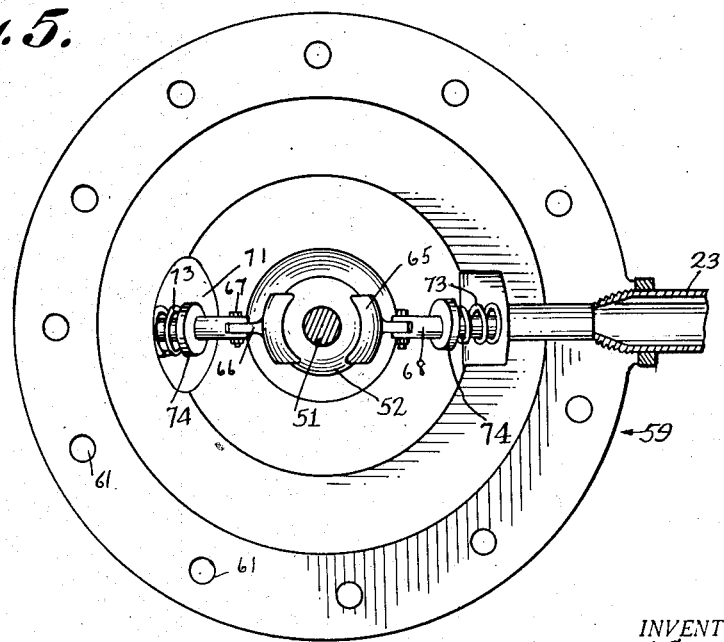

Figs. 4 and 5 are sectional views on lines 4—4 and 5—5 of Fig. 3, respectively.

Figure 6:
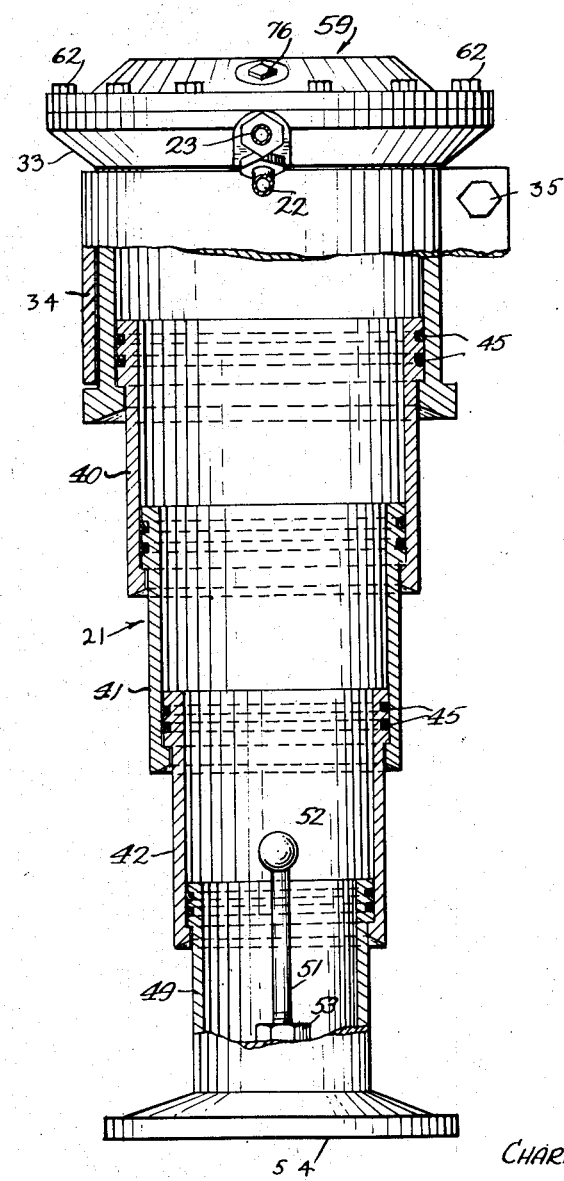

Fig. 6 is a partly sectional view of the jack in expanded position.

Figure 7:
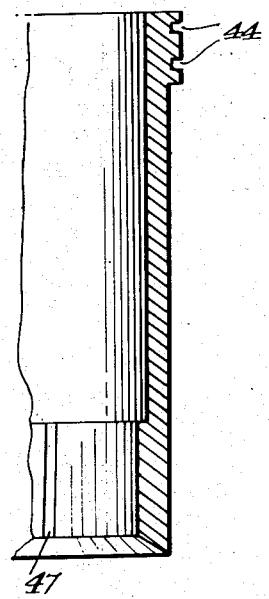

Fig. 7 is a sectional view of one of the jack cylinders.

Figure 8:
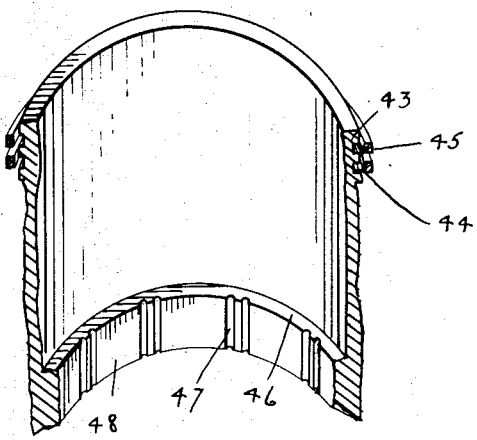

Fig. 8 is a partly sectional perspective view of one of the jack cylinders.

Figure 9:
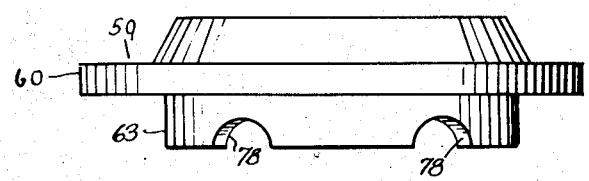

Fig. 9 is a front elevational view of the cap jack.

Figure 10:
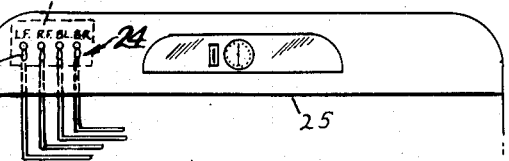

Fig. 10 is a detailed view showing the controls mounted on the dash-board.

Figure 11:
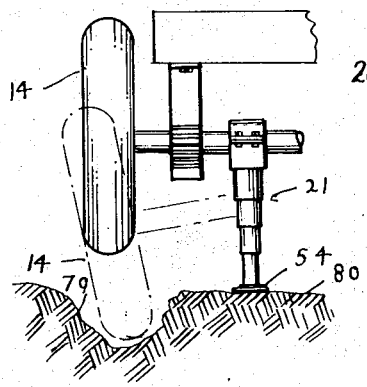

Fig. 11 is an elevational view of the jack in operation.

There is shown at 10 a vehicle chassis to which this invention has been applied, this chassis including a rear axle housing 11, a chassis frame 12, front axle 13, rear wheels 14 and front wheels 15. Secured to the chassis frame 12 is a suitable pressure and vacuum producing pump 17 having any suitable means such as a gear 18 having an operative connection through the transmission casing 19 to the vehicle motor 20. One jack unit 21 of this invention is mounted at each end of the rear axle housing 11 and at the front end of the chassis frame 12 adjacent to each end of the front axle 13. Inasmuch as each jack unit 21 is identical in principle and construction, only one will be illustrated and described in detail, although it will be obvious that the jacking units at the front of the frame 12 may be slightly larger than those at the rear at the axle 11 to compensate for the difference in manner of mounting them on the wheel. Each jacking unit 21 is connected to the pump 17 by pressure line 22 and a vacuum line 23. A control unit shown generally at 24 is mounted on the instrument board 25 of the vehicle for connecting either the pressure line or the vacuum line from the jack to the pump and simultaneously cutting off the line which is not to be used, one control unit including a separate individual control 26 for each individual jacking unit 21 and if desired a locking means may be provided for the control units by having them set behind a lockable door 27 in the instrument board 25. Each vacuum line and pressure line includes a suitable check valve 28 and 29 adjacent to jack unit 21 so that when the jack is in extended position the pressure can not escape backwardly through the pressure line and similarly when the jack is in retracted position the vacuum or reduced pressure within the jack will not be affected by pressure leaking backwardly through the vacuum line.

Each jacking unit 21 includes a cylindrical housing 30 having a reduced neck 31 extending between a lower shoulder 32 and an upper beveled shoulder 33. This neck 31 is particularly adapted for receiving a collar 34 secured thereon by bolts 35 for attaching it to any suitable bracket 36 or 37 for attaching it to the rear axle or front of the chassis frame. The innerwall 38 of the cylindrical housing 30 is preferably highly machined and polished and terminates in a lower inner shoulder 39. Within the cylindrical housing 30 are a plurality of telescopic cylinder sleeves 40, 41 and 42, each identical in construction and successively smaller in size. While three similar cylinder sleeves are shown, it is obvious that the jack 21 may include a greater or lesser number of these sleeves, according to the size of the completed unit that is desired.

Furthermore, the jack may be made to extend a greater distance without varying the number of the sleeves by simply varying the individual length of each of the sleeves. Each of these sleeves include an upper outer shoulder 43 provided with one or more piston ring grooves 44 adapted to receive piston ring 45 therein. The outer diameter of the shoulder 43 on sleeve 40 is slightly less than the inner diameter of the innerwall 38 on cylindrical housing 30. The piston rings in the shoulder 43 provide a substantially sealing fit therein, the inner wall of each sleeve is highly polished and the shoulder and piston rings on each succeeding shoulder bear the same relation to the innerwall as the next outer sleeve.

Each of the cylinder sleeves 40, 41 and 42, is provided with a lower inner shoulder 46 which may be vertically milled or provided with vertical grooves 47 so as to insure a passageway and prevent trapping or locking of air between the upper outer shoulder 43 or the lower inner shoulder 39 or 46. As will be apparent, the innerwall 48 below the shoulder 46 provides a guide for the vertical movement of each next succeeding inner cylinder sleeve. A central piston 49 has a similar upper shoulder and piston rings as the other sleeves and is provided with a closed base 50 which is provided with a threaded recess for securing a rod 51 therein, a ball 52 being provided on the upper end of the rod 51; a lock nut 53 is provided for holding the rod 51 firmly in position on the closed base 50; at the bottom of the base 50 a supporting base or foot 54 is secured thereto by a plurality of stud bolts 55. This supporting base or foot 54 is preferably concave as viewed from the bottom or to be more exact has a horizontal center portion 56 secured by a flared skirt portion 57 to an outer flat ring 58; the lower ends of the cylindrical housing 30 and cylinder sleeves 40, 41 and 42 being each shaped correspondingly so that in the closed position, as shown in Figure 3, there will be substantially little if any space left therebetween. By thus making this supporting base or foot 54 substantially concave, not only are the heads of the stud bolts 55 protected from pressure when in extended position as in 56, but also a firmer footing is provided especially when in operation on soft mud or dirt or on a slippery surface, such as ice or sleet.

As will be apparent, the central piston may move within the cylinder sleeve 42, similarly the cylinder 42 acts as a piston movable within the cylinder 41 and so on until the cylinder 40 which is operable as a piston within the cylindrical housing 30, the guides 48 and cooperating shoulder limiting the downward movement of the sleeves.

Secured to the upper surface of the beveled shoulder 33 of the cylindrical housing 30 is a cap 59. This cap 59 is provided with an externally extending flange 60 having a plurality of bolt apertures 61 therethrough, through which stud bolts 62 are passed to secure the same to the cylindrical housing 30 by threaded apertures within the beveled shoulder 33. The cap 59 is likewise provided with a depending cylindrical wall 63 having an external diameter substantially equal to the internal diameter of wall 38 of cylindrical housing 30 so that a pressure and vacuum proof fit will be provided when the cap 59 is secured by the bolts 62 to the cylindrical housing 30, the inside of the cap 59 is provided with a concave recess 64 so that the ball 52 on rod 51 may extend partly therein when the jack is in closed position.

Means are provided for holding or locking the jack in closed position by holding the ball 52 in this recess, this holding or locking means includes a plurality of retaining socket feet 65, two being shown on the drawings but it being obvious that more may be provided if desired. Each socket foot 65 is provided with a stem 66 pivotally secured as at 67 to a bent arm 68, this bent arm 68 is provided with a rod portion 69 extending through a web 70 integrally formed in the cap 59 by drilling recesses 71 and 72 thereto from opposite sides, a spring 73 extends between the web 70 and a spring seat 74 fixed on the rod portion 69; the other end of the rod portion 69 within the recess 72 is threaded to receive a nut 75; springs 73 are of suitable strength but will yield when sufficient pressure is applied within the piston 49 to permit the rod portion 69 to move slightly and allow the socket feet 65 to pivot and release the ball 52 therefrom, thereby allowing the jack to extend, a toggle locking arrangement being thus in effect provided; on retraction of the jack a sufficient vacuum is produced within the piston 49, the foot 65 will again move around to the holding position below the ball 52. The recesses 72 are each closed with tapered threaded plugs 76 so as to prevent escape of the vacuum or pressure therewithin. Pressure line 22 entering through the port 77 builds up pressure through ports 78 in flange 63 to operate the jack and when the jack is to be retracted the control 24 is operated to cut off the pressure and then to connect up the vacuum line 23 of the pressure and vacuum pump 17. By suitably opening the controls, the jack may be extended any desired amount less than the full amount, the pressure serving to hold the jack partly in, as well as fully extended position. Any suitable fluid pressure medium may be utilized, either air or liquids, such as the type familiarly used in hydraulic brakes. The bottom of the inner wall 63 of the cap 59 serves to limit the upward movement of the cylinders 40, 41 and 42 and ports 78 are provided in this wall to permit the pressure and vacuum to pass therethrough to the outer cylinder sleeves. In operation the operator need only operate the controls 24 to selectively connect the pressure and vacuum pump 17 to one or more of the jacking units 21 as desired and then by operating the pressure and vacuum pump 17 may raise or lower the selected jacks to correspondingly raise or lower the vehicle.

As shown in Fig. 11, the rear wheel 14 has been raised from a position 14' in a mud hole 79 in the ground 80, enabling a bridge of planks, for instance, to be placed across the mud hole to permit the vehicle to continue on. It also permits the application of mud chains especially on wheels of the solid disc type, for "strap on" mud hooks are not very applicable on solid disc type wheels.

The novel features and the operations of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

1. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base only and adapted to overlap the ends of each of said remaining cylinders when retracted, a cap secured to said housing, port means extending into said jack permitting pressure and vacuum means to enter therethrough and cooperating ball and toggled socket means extending from said cap and said base of said inner and smaller cylinder for holding said telescoping cylinders in retracted position and releasing said telescoping cylinders under pressure operation to extended position.

2. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base and adapted to overlap the ends of said remaining cylinders when retracted, a cap secured to said housing, port means extending into said jack permitting pressure and vacuum means to enter therethrough and cooperating ball and toggled socket means extending from said cap and said base of said inner and smaller cylinder for holding said telescoping cylinders in retracted position and releasing said telescoping cylinders under pressure operation to extended position, said holding and releasing means comprising a ball secured to said base and socket means secured to said housing cap.

3. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base and adapted to overlap the ends of said remaining cylinders when retracted, a cap secured to said housing, port means extending into said jack permitting pressure and vacuum means to enter therethrough and cooperating means extending from said cap and said base of said inner and smaller cylinder for holding said telescoping cylinders in retracted position and releasing said telescoping cylinders under pressure operation to extended position, said holding and releasing means comprising a ball secured to said base and socket means secured to said housing cap, said socket means comprising a plurality of socket feet, a corresponding plurality of bent arms, each socket foot being pivotally secured to one of said bent arms, the other end of each bent arm being depressibly mounted in said housing cap.

4. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base and adapted to overlap the ends of said remaining cylinders when retracted, a cap secured to said housing, port means extending into said jack permitting pressure and vacuum means to enter therethrough and cooperating means extending from said cap and said base of said inner and smaller cylinder for holding said telescoping cylinders in retracted position and releasing said telescoping cylinders under pressure operation to extended position, said holding and releasing means comprising a ball secured to said base and socket means secured to said housing cap, said socket means comprising a plurality of socket feet, a corresponding plurality of bent arms, each socket foot being pivotally secured to one of said bent arms, the other end of each bent arm being depressibly mounted in said housing cap and a compression spring mounted on said bent arm urging said bent arm in the direction of said socket foot.

5. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base and adapted to overlap the ends of said remaining cylinders when retracted, a cap secured to said housing, port means extending into said jack permitting pressure and vacuum means to enter therethrough, an internal depending flange on said cap fitting tightly within said housing, and port means through said depending flange permitting vacuum and pressure to reach each cylinder, said flange limiting the upward movement of said cylinders.

6. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base only and adapted to overlap the ends of each of said remaining cylinders when retracted, a cap secured to said housing, port means extending into said jack permitting pressure and vacuum means to enter therethrough, cooperating means extending from said cap and said base of said inner and smaller cylinder for holding said telescoping cylinders in retracted position and releasing said telescoping cylinders under pressure operation to extended position, said holding and releasing means comprising a ball secured to said base and socket means secured to said housing cap, said socket means comprising a plurality of socket feet, a corresponding plurality of bent arms, each socket foot being pivotally secured to one of said bent arms, the other end of each bent arm being depressibly mounted in said housing cap, a compression spring mounted on said bent arm urging said bent arm in the direction of said socket foot, said housing being cylindrical, an internally extending shoulder at the bottom of said housing and at the bottom of each progressively decreasing cylinder, said shoulder forming said base on said inner and smaller cylinder, an externally extending flange at the top of each telescoping cylinder, piston ring means set in each externally extending flange to provide a pressure and vacuum tight fit between said telescoping cylinders, each said internally extending shoulder having a non-pressure tight fit.

7. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base and adapted to overlap the ends of said remaining cylinders when retracted, a cap secured to said housing, port means extending into said jack permitting pressure and vacuum means to enter therethrough, cooperating means extending from said cap and said base of said inner and smaller cylinder for holding said telescoping cylinders in retracted position and releasing said telescoping cylinders under pressure operation to extended position, said holding and releasing means comprising a ball secured to said base and socket means secured to said housing cap, said socket means comprising a plurality of socket feet, a corresponding plurality of bent arms, each socket foot being pivotally secured to one of said bent arms, the other end of each bent arm being depressibly mounted in said housing cap, a compression spring mounted on said bent arm urging said bent arm in the direction of said socket foot, said housing being cylindrical, an internally extending shoulder at the bottom of said housing and at the bottom of each progressively decreasing cylinder, said shoulder forming said base on said inner and smaller cylinder, an externally extending flange at the top of each telescoping cylinder, piston ring means set in each externally extending flange to provide a pressure and vacuum tight fit between said telescoping cylinders, each said internally extending shoulder having a non-pressure tight fit, an internal depending flange on said cap fitting tightly within said housing, and port means through said depending flange permitting vacuum and pressure to reach each cylinder, said flange limiting the upward movement of said cylinders.

8. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base and adapted to overlap the ends of said remaining cylinders when retracted, a cap secured to said housing, port means extending into said jack permitting pressure and vacuum means to enter therethrough and cooperating means extending from said cap and said base of said inner and smaller cylinder for holding said telescoping cylinders in retracted position and releasing said telescoping cylinders under pressure operation to extended position, said holding and releasing means comprising a ball, a rod on which said ball is mounted, said rod being secured to said base and toggle socket means secured to said housing cap.

9. A fluid pressure and vacuum operable jack comprising a housing, means for securing said housing to a vehicle to be supported, a plurality of telescoping cylinders progressively decreasing in diameter with the inner and smaller one at the free end when extended, a closed base on said smaller one, a supporting foot secured to the bottom of said base only and adapted to overlap the ends of each of said remaining cylinders when retracted, a cap secured to said housing, and port means extending through said cap permitting pressure and vacuum means to enter therethrough, said supporting foot being substantially concave.

CHARLES W. CARPENTER.